C. E. OGDEN.
MEANS FOR CHARGING STORAGE BATTERIES.
APPLICATION FILED FEB. 18, 1920.
1,430,106.
Patented Sept. 26, 1922.
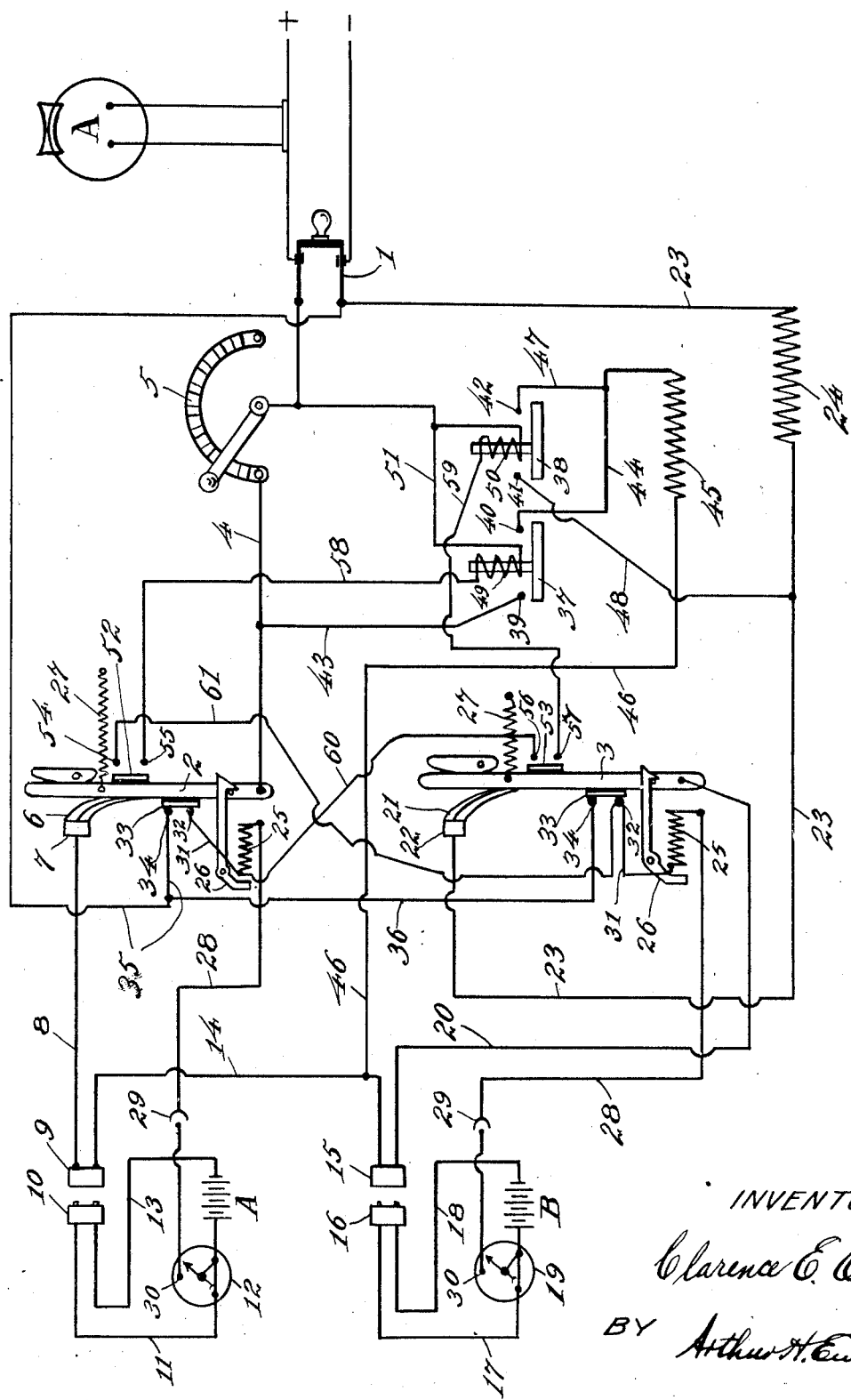
INVENTOR
Clarence E. Ogden,
BY Arthur H. Ewald,
ATTORNEY.

Patented Sept. 26, 1922.

1,430,106

UNITED STATES PATENT OFFICE.

CLARENCE E. OGDEN, OF CINCINNATI, OHIO.

MEANS FOR CHARGING STORAGE BATTERIES.

Application filed February 18, 1920. Serial No. 359,737.

*To all whom it may concern:*

Be it known that I, CLARENCE E. OGDEN, a citizen of the United States, and resident of Cincinnati, in the county of Hamilton and State of Ohio, have invented certain new and useful Improvements in Means for Charging Storage Batteries, of which the following is a full, clear, and exact description, reference being had to the accompanying drawings, forming a part of this specification.

My invention relates to means for charging storage batteries.

In the charging of storage batteries as used on industrial trucks, tractors and similar vehicles, where the battery voltage is comparatively low, as compared with the usual commercial line voltage, from 110 to 220 volts, a considerable loss of current is usually entailed. In order to overcome this loss it has for some time been the practice to charge a number of batteries in series, whereby the tremendous wastage is to a large extent eliminated. This method is practical in the charging of Edison cells, for the reason that the rate of charging such cells is the same throughout the entire length of charging, regardless of the previous state of discharging of the cell, and furthermore should one battery become fully charged before the other, it may be left on charge without injury until the second battery is fully charged, as the overcharge is not detrimental to this type of cell. Lead cells, however, cannot be overcharged without serious harm, for the reason that continuing to charge this type of cell at a high rate after the gassing point is reached seriously affects its life, and it is, therefore, necessary where the charging of a lead cell is begun at a high rate to lower the rate when the battery begins to gas. By reason of these facts, and as it is seldom possible to secure two batteries at exactly the same state of discharge the series charging of lead cells has been impractical up to the present time. The principal object of the present invention is to provide means whereby cells of either type may be charged in series at a safe uniform rate throughout the entire charge, each battery being automatically disconnected when fully charged, and suitable resistance automatically connected in series with the remaining battery or batteries being charged.

A further object of this invention is to provide means whereby, when the final battery of a plurality of batteries being charged has become fully charged, the resistances, as well as the batteries, are disconnected and the flow of current entirely cut off.

Further objects will appear from the following detailed description of this invention.

In the drawings:

The figure is a diagrammatic view of the several instruments and connections employed in the present invention.

The numeral 1 indicates a line switch; 2 and 3 automatic circuit breaking switches for controlling circuits for the charging of batteries A and B in the present exemplification of the principles of this invention. The positive wire 4 of the line is connected through adjustable resistance 5 with the switch 2. The spring contact 6 of the switch 2 is adapted to make contact with a terminal 7 connected by wire 8 with a battery socket 9. The battery plug 10 is connected by means of a wire 11 with an ampere hour meter 12, and thence with battery A. The opposite pole of battery A is connected by wire 13 with the plug 10. A wire 14 leads from the socket 9 to a similar socket 15 adapted to receive a battery plug 16 similarly connected by wires 17 and 18 with ampere hour meter 19 and battery A respectively. A wire 20 leads from the socket 15 to automatic circuit breaking switch 3, the spring contact 21 of which makes contact with a terminal 22 from which a wire 23 leads through a fixed resistance 24 to the negative pole of switch 1.

The automatic circuit breaking switches 2 and 3 may be of any ordinary type, and in the present exemplification each is provided with a shunt coil 25 which when energized operates a trigger 26 releasing the switch arm so that the main contacts 6,—7, or 21—22 may be opened by means of a spring 27. One pole of each of the shunt coils 25 is electrically connected by means of a wire 28 and clip connection 29 with a pin 30 in the face of one of the ampere hour meters, the pins being located at the points indicating completion of the charge of the connected battery. The other pole of each of the coils 25 is connected by means of a wire 31 with a terminal 32 arranged to make contact with a conductive plate 33 on the arm of the related switch 2 or 3. The plates 33 are also adapted to make contact with terminals 34; the terminal 34 of switch 2 is connected by means of a wire 35 with the negative pole of switch 1, and the terminal 34 of switch 3 is connected with the wire 35 by means of wire 36. As will be seen, the plates 33 of both switches are arranged to make contact with the respective terminals 32 and 34 when the main switch contacts 6—7 and 21—22 respectively, are closed.

The mechanism further comprises solenoid switches 37 and 38 arranged to contact respectively with terminals 39—40 and 41—42. Terminal 39 is connected by means of a wire 43 with the positive line 4, and terminal 40 by means of a wire 44 with fixed resistance 45, and thence by means of a wire 46 with the wire 14. Terminal 42 is connected by means of a wire 47 with a wire 44, and terminal 41 by wire 48 with wire 23. The coils 49 and 50 respectively of the switches 37 and 38 are connected by means of wire 51 with the positive line wire. The arms of switches 2 and 3 are provided with contact plates 52 and 53 respectively, insulated from the arm. Plate 52 is adapted to make contact with terminals 54 and 55 when switch 2 is open, and plate 53 is arranged to make contact with terminals 56 and 57 when switch 3 is open. The negative pole of coil 49 is connected by wire 58 with terminal 55; and the negative pole of coil 50 is connected by wire 59 with terminal 57. Terminal 56 is connected by wires 60 and 31 to terminal 32 of switch 2. Terminal 54 is connected by wire 61 with terminal 32 of switch 3.

The operation of the device is as follows:
The mechanism as illustrated is adapted for the charging of two storage batteries A and B in series. When the batteries have been connected by means of plugs 10 and 16 respectively, and the shunt lines connected by means of clips 29, the line switch 1, is closed, as well as the automatic circuit breaking switches 2 and 3. The circuit is then through switch 1 positive, adjustable resistance 5 by means of which the device is adapted to circuits of various voltage, wire 4, switch 2, wire 8, meter 12, battery A, wires 13, 14, 17, meter 19, battery B, wires 18, 20, switch 3 wire 23, resistance 24, to switch 1, negative. When either of the batteries is fully charged a circuit is established through the connected shunt coil by means of the needle of its meter contacting with the pin 30 in the face thereof. For instance, should battery A become fully charged a circuit is established through switch 2, wires 8, 11, 28, coil 25, wire 31, terminal 32, plate 33, terminal 34 and wire 35 to switch 1, negative. The energizing of the coil 25 operates the trigger 26, releasing the arm of switch 2, which is opened by means of spring 27, thus also opening the shunt coil circuit between terminals 32 and 34. At the same time plate 52 on the arm of switch 2 makes contact between terminals 54 and 55. A circuit is thus established through coil 49 of solenoid switch 37, as follows: from switch 1, positive, through wire 51 coil 49, wire 58, terminal 55, plate 52, terminal 54, wire 61, terminal 32, plate 33, of switch 3, which is still of course closed. terminal 34 of said switch, wires 36 and 35 to switch 1 negative. The coil 49 is thus energized, closing the solenoid switch 37 which introduces resistance 45 into the circuit charging the remaining battery B; the circuit being as follows: from switch 1, positive, wires 4, 43, switch 37, wire 44, resistance 45, wire 46 to wire 14, and thence through battery B and switch 3 as above set forth. When, however, battery B is first fully charged, a shunt circuit is established through coil 25 of switch 3, which is thus opened, the shunt circuit through said coil being simultaneously opened in the manner above set forth by opening the contact between plate 33 and terminals 32 and 34. The opening of switch 3 establishes a circuit through coil 50 of solenoid switch 38 as follows: switch 1, positive, wire 51, coil 50, wire 59, terminal 57, plate 53, terminal 56, wire 60, terminal 32, plate 33, of switch 2, which is closed, terminal 34 of said switch and wire 35 to switch 1 negative. The closing of switch 38 establishes a charging circuit through battery A as follows: from switch 1, positive, switch 2, wires 8, 11, Battery A, wires 13, 14, 46, resistance 45, wire 47, switch 38, wire 48, resistance 24 and wire 23 to switch 1 negative.

When the last battery has become fully charged, all circuits are opened, the circuits through coils 49 and 50 being opened by reason of the fact that plate 52 of switch 2 is in circuit with plate 33 of switch 3, and similarly plate 53 of switch 3 is in circuit with plate 33 of switch 2; thus it requires that one of the switches be closed in order that a circuit through either of the coils 49 or 50 be established, and when both of the switches 2 and 3 are open the circuits are of course opened. Hence when the final battery has been fully charged, there is no wastage of current through the maintenance of a closed circuit through the resistance.

Having thus fully described my invention, what I claim as new and desire to secure by Letters Patent is:

1. Means for charging storage batteries comprising in combination with a charging circuit, electrical connections for a plurality of storage batteries to be charged, said connections being arranged to be connected in series in said charging circuit, an independent switch for controlling the circuit through each of the batteries, a meter for gauging the charge to each battery, means whereby each of said meters is arranged to open the switch controlling the circuit through its battery, resistance, means whereby upon the opening of either of said switches, the circuit is closed through the remaining battery and suitable resistance, and means whereby when the final battery is fully charged, said charging circuit is opened.

2. Means for charging storage batteries comprising in combination with a charging circuit, electrical connections for a plurality of storage batteries to be charged, said connections being arranged to be connected in series in said circuit, an independent automatic circuit breaking switch for controlling the circuit through each of said batteries, a meter for gauging the charge to each battery, means whereby each of said meters is arranged to open the automatic circuit breaking switch controlling the circuit through its battery, resistance, and a plurality of self closing switches, each of which is arranged to be closed by the opening of one of said automatic circuit breaking switches and is connected in series with said resistance and the remaining automatic circuit breaking switch, whereby upon the opening of either of said automatic circuit breaking switches, the circuit is closed through the remaining battery and suitable resistance.

3. Means for charging storage batteries comprising in combination with a charging circuit, electrical connections for a plurality of storage batteries to be charged, said connections being arranged to be connected in series in said circuit, an independent automatic circuit breaking switch for controlling the circuit through each of said batteries, a meter for gauging the charge to each battery, means whereby each of said meters is arranged to open the automatic circuit breaking switch controlling the circuit through its battery, resistance, a plurality of self closing switches, each of which is arranged to be closed by the opening of one of said automatic circuit breaking switches and is connected in series with said resistance and the remaining automatic circuit breaking switch, whereby upon the opening of either of said automatic circuit breaking switches, the circuit is closed through the remaining battery and suitable resistance, and means whereby when the final battery is fully charged, said charging circuit is opened.

4. Means for charging storage batteries comprising in combination with a charging circuit, electrical connections for a plurality of storage batteries to be charged, said connections being arranged to be connected in series in said circuit, an independent automatic circuit breaking switch for controlling the circuit through each of said batteries, a meter for gauging the charge to each battery, means whereby each of said meters is arranged to open the automatic circuit breaking switch controlling the circuit through its battery, resistance, a plurality of self closing switches each of which is connected in series with said resistance and is provided with an operating coil arranged to be energized to close said switch by a circuit closed when a related automatic circuit breaking switch is opened and the remaining automatic circuit breaking switch is closed, whereby upon the opening of either of said automatic circuit breaking switches the circuit is closed through the remaining battery and suitable resistance, and when the final automatic circuit breaking switch is opened said charging circuit is also opened.

CLARENCE E. OGDEN.